United States Patent [19]

Boden

[11] 4,382,883
[45] May 10, 1983

[54] METHOD FOR PRODUCING A STORAGE BATTERY PLATE

[75] Inventor: David P. Boden, Collegeville, Pa.

[73] Assignee: Allied Corporation, Morris Township, Morris County, N.J.

[21] Appl. No.: 286,805

[22] Filed: Jul. 27, 1981

[51] Int. Cl.³ ............................................. H01B 1/08
[52] U.S. Cl. ................................. 252/521; 252/182.1
[58] Field of Search .............................. 252/182.1, 521

[56] References Cited

U.S. PATENT DOCUMENTS 1,929,357 10/1933 Johnstone ......................... 252/182.1
3,969,141 7/1976 Eriksson ............................ 252/182.1

Primary Examiner—Paul R. Michl
Attorney, Agent, or Firm—Roger H. Criss; Robert H. Johnson

[57] ABSTRACT

An improvement in a method for producing a negative lead-acid storage battery plate is disclosed. The improvement involves the production of a paste from sulfuric acid and a lead oxide mixture containing, distributed therethrough, from 0.1 to 1.0 part of at least one barium carbonate per 100 parts of lead therein, calculated as PbO. Preferably the paste contains from 0.1 to 0.4 part of barium carbonate per 100 parts of lead. As a consequence of reaction between the sulfuric acid and the barium carbonate, finely-divided barium sulfate is formed in situ in the paste and carbon dioxide to harden the paste is released. The barium sulfate functions as an expander and the carbon dioxide initiates curing of the paste.

2 Claims, No Drawings

METHOD FOR PRODUCING A STORAGE BATTERY PLATE

BACKGROUND OF THE INVENTION

1. Field of the Invention

This invention relates to storage batteries of the lead-acid type. More particularly, the invention relates to methods for producing negative plates for such batteries.

Lead-acid storage batteries, commonly used in connection with automotive and other ignition systems, and in industrial applications, for example fork lift trucks and stand-by power systems, contain at least one cell which consists of positive electrodes of lead peroxide and negative electrodes of spongy lead, immersed in a sulfuric acid electrolyte. As these batteries are of the secondary type, they can be recharged at any point during the discharge portion of their charge/discharge cycle by applying an external current source to pass electrical current through the battery cells in a direction opposite to that in which the cells supply current to a load. Accordingly, lead-acid storage batteries can be continuously maintained at or near full electrical capacity by means of an alternator or generator connected thereto and operated, for example, by an associated engine.

2. Description of the Prior Art

The negative electrodes of lead-acid storage batteries, commonly called negative "plates," are usually fabricated by conventional techniques which include, for example, the steps of preparing a paste from lead oxide (usually litharge and/or red lead) and sulfuric acid, shaping the paste to a desired configuration by applying the paste to a supporting grid composed of a lead alloy having the desired size and shape, drying or "curing" the pasted grid by exposure thereof to an atmosphere containing carbon dioxide under controlled conditions of temperature and humidity, and then forming (charging) the cured plate in a sulfuric acid bath.

A typical paste for a negative plate of a lead-acid storage battery according to the prior art can be prepared by mixing lead oxide(s), usually in the form of litharge or red lead, with dilute sulfuric acid. Suitable lead oxides and mixtures thereof used for this purpose in the lead-acid storage battery industry are described in G. W. Vinal, *Storage Batteries*, 4th ed., at pages 21–23. The sulfuric acid usually comprises about 40–42 percent* of the paste; fibers (to facilitate handling of the plate after pasting) and water (to provide a paste having the desired consistency) are also usually added.

*The terms "percent" and "parts" as used herein and in the appended claims refer to percent and parts by weight unless otherwise indicated.

It has become common practice in the art to add relatively inert materials termed "expanders" to the paste from which negative plates are produced. The function of expanders is to prevent contraction and solidification of the spongy lead of the plate after its installation in the finished battery assembly and consequent diminution of the electrical capacity of the battery and shortening of its useful life. Compounds heretofore suggested for use as suitable negative plate expanders include, for example, lampblack, barium sulfate, graphite, ground carbon, ground wood, and insoluble organic compounds such a lignosulfonic acid and its derivatives. The effects and advantages of the use of expanders in producing negative battery plates is discussed in Kirk-Othmer, *Encyclopedia of Chemical Technology*, 3rd. ed., vol. 3, at page 655.

U.S. Pat. No. 1,929,357 suggests blending cellulose or the like with barium sulfide and sodium sulfate to produce barium sulfate and sodium sulfide, and drying and pulverizing of this mixture. The dried and pulverized mixture is then added, to the extent of from 0.5 to 1.0 percent, to a mixture of litharge (98.75 to 99.25 percent) and lampblack (0.25 percent), and the resulting mixture is subsequently moistened with dilute sulfuric acid to produce a paste having a desired consistency. This patent also discloses that barium compounds such as barium hydrate and barium nitrate can be used in place of the barium sulfide and precipitated, for example, with sodium carbonate in lieu of sodium sulfate.

The negative plates of a lead-acid battery, composed of a mixture of lead sulfates when the battery is in a discharged condition, are converted to a sponge-like mass of lead particles when the battery is charged. These lead particles have a tendency to coalesce and, consequently, to reduce the sponge-like nature of the electrode. It is believed that expanders prevent such coalescence and enable the lead particles to remain soft and spongy, thus imparting improved electrical characteristics to the electrode.

An additional requirement in the manufacture of negative plates for lead-acid batteries is that they be "cured" after pasting. In this process the plate can be dried, either at ambient or elevated temperature, in a humid atmosphere containing a small percentage of carbon dioxide. The carbon dioxide reacts with the lead oxide(s) in the battery plate to form lead carbonate, which acts as a cement to hold the electrode together and to impart physical strength during subsequent processing and during operation of the finished battery. Without adequate curing, battery plates have been found to have insufficient strength to survive further processing or to provide long, trouble-free life in operation in the finished battery.

BRIEF DESCRIPTION OF THE INSTANT INVENTION

It has now been discovered, and the instant invention is based on this discovery, that both the addition of an expander to a negative plate of a lead-acid storage battery and at least initial curing of the plate can be carried out in one process and in a controlled manner, thereby simplifying and improving a method of producing said negative plate.

Accordingly, the instant invention is based upon the discovery of an improvement in a conventional method for producing a negative plate of a lead-acid storage battery. The method includes the steps of preparing a paste from at least one lead oxide and sulfuric acid, shaping the paste to a desired plate configuration, and then drying the shaped paste. The improvement involves producing the paste from a sulfuric acid and lead oxide mixture containing from 0.1 to 1.0 part of at least one barium carbonate per 100 parts of lead therein, calculated as PbO; preferably, the mixture contains from 0.1 to 0.4 part of barium carbonate per 100 parts of lead. When a negative plate is produced by the improved method of this invention, finely-divided barium sulfate is formed in situ in the paste, and carbon dioxide to harden the paste is released, as a consequence of reaction between the sulfuric acid and the barium carbonate. The barium sulfate formed in situ is an effective expander and the carbon dioxide released is effective at least to initiate curing of the negative plate. The instant method accelerates and simplifies plate fabrication, and produces stronger and more desirable finished plates than do conventional methods.

Accordingly, it is an object of this invention to provide an improvement in a method for producing a negative storage battery plate.

Other objects and advantages of the invention will be apparent from the following detailed description, which is intended only to illustrate and disclose, and in no way to limit the invention as defined in the claims appended hereto.

DETAILED DESCRIPTION OF THE INVENTION

This invention relates to improvements in lead-acid storage batteries, and particularly to an improvement in a method for producing negative plates for such batteries. The improvement involves adding barium carbonate to the paste composition from which such a negative plate is produced; the barium carbonate reacts with sulfuric acid to produce a barium sulfate expander in situ and carbon dioxide which initiates at least partial curing of the pasted plate. The improvement facilitates and simplifies manufacture of the plate and produces a finished plate of superior quality.

A negative storage battery plate according to the invention can be produced by a known, conventional method modified as disclosed herein. Specifically, a negative plate according to the invention can be fabricated by modifying a method which includes the steps of preparing a lead oxide/sulfuric acid paste, shaping the paste, preferably on a lead alloy grid, to a desired size depending on the size and type of the finished battery into which the plate is to be assembled, and then drying the shaped paste. The production of conventional negative storage battery plates is described in detail in Kirk-Othmer, *Encyclopedia of Chemical Technology*, 3rd ed., vol. 3, at pp. 655-657, and in references cited in the bibliography.

According to the instant invention barium carbonate, rather than the conventional barium sulfate, is added to a negative plate paste to produce an expander, providing a novel and unexpected result in that the sulfuric acid used to form the active material of the negative plate reacts with the barium carbonate to form barium sulfate and water while releasing carbon dioxide. Barium sulfate molecules thus are precipitated in situ in the paste, that is, in those places in the paste originally occupied by barium carbonate molecules. The resulting barium sulfate, distributed throughout the paste in finely-divided form, causes the lead particles in the paste to remain soft and spongy and thus acts as an expander; concurrently, the carbon dioxide released during the barium carbonate/sulfuric acid reaction initiates curing of the plate which continues so long as carbon dioxide is evolved by the reaction. Because of the resulting close proximity of the lead oxide active material of the plate and the carbon dioxide released by the reaction, curing is significantly accelerated and more effective than that which occurs when the pasted negative plate is cured only by exposure to an external source of carbon dioxide or the like, in a separate processing step. In addition to these advantages, the action of the expander and curing can be precisely controlled because, according to the present invention, the quantity of barium carbonate added is accurately controlled.

By comparison with a procedure which involves solely the external production of an expander as a dry powder and subsequently blending it with the paste or blending dry paste materials with a wet expander slurry, the method of the instant invention provides a more effective distribution of expander in the active material of the negative plate; barium sulfate produced in situ is in a finely-divided form, and is distributed evenly throughout the paste. Also, carbon dioxide released throughout the paste during the reaction between barium carbonate and sulfuric acid appears to strengthen the paste. An unexpectedly superior finished article is consequently produced.

The method of the following Example for the production of a negative storage battery plate includes a preferred embodiment of the instant invention, constituting the best mode presently contemplated. The Example is intended only to illustrate and disclose and in no way to limit the invention.

EXAMPLE

A pasted and dried negative plate for a lead-acid storage battery was produced by the method described below. Except for the use of barium carbonate, the method used to produce the plate was conventional.

An alloy consisting of substantially 5 percent antimony and 95 percent lead was used to fabricate a negative plate grid 432.5 mm. in length by 147.5 mm. in width. The alloy was mold-cast to the above dimensions using a conventional procedure for casting battery grids; the grid was of the commonly-used straight crossbar design.

A paste for application to the grid was prepared from 2400 lbs. of lead oxide powder (prepared by the Barton process), 4.0 lbs. of barium carbonate (100% barium carbonate with minor impurities), 2.0 lbs. of lampblack, 6.0 lbs. of a mixture of lignosulfonic acids and their derivatives, 45.0 liters of sulfuric acid of 1.400 specific gravity and 135.0 liters of water. The lead oxide, the barium carbonate, the lampblack and the lignosulfonic acid were thoroughly blended in a commercial lead-acid battery paste mixer. The sulfuric acid and water were then charged to the mixer, with stirring, over a period of about 20 minutes, after which mixing was continued until the mixture was observed to thicken to the consistency of thick mortar; a steady evolution of carbon dioxide occurred during the final period of mixing. After mixing was completed a portion of the paste was applied as uniformly as possible to the previously fabricated grid, using a conventional pasting machine. The maximum thickness of the paste as applied to the grid was found to be 0.180 inches.

The pasted grid described above was dried for 48 hours in air at approximately 90 percent relative humidity, and at a dry bulb temperature of about 35 degrees C. The dried grid was found to be unexpectedly hard and durable by comparison with a grid previously produced as described in the foregoing example, except that the batch contained 4.0 lbs. barium sulfate rather than 4.0 lbs. barium carbonate. The improvement in hardness and durability of a dried paste produced by the method of the invention is believed to be the consequence of the action of carbon dioxide formed during paste mixing; more effective curing of the pasted plate apparently occurs as a consequence of the evolution of carbon dioxide throughout the mixed paste during the reaction of the lead oxide with sulfuric acid. It will be appreciated that additional curing can occur as a consequence of reaction between the paste and additional carbon dioxide, for example that present in air.

While lead oxide prepared by the Barton Process is preferred for use in producing a battery plate according to the instant invention because of the relative ease of subsequent plate formation, it will be appreciated that other lead oxides can also be used. Examples of lead oxides which can be used in producing a paste for a negative battery plate according to the invention include the following, all commonly used in the art: litharge, massicot, lead suboxide, red lead, lead sesquioxide, and mixtures of these oxides with or without litharge. Whichever lead oxide or mixture is utilized, however, comparatively high purity has been found to be important; preferably, such impurities as silicon, calcium, and iron should be present to an extent not greater than 1 percent of the total weight of lead oxide(s) used. Whatever oxide(s) are used, chemical reaction with sulfuric acid to form lead sulfate occurs reasonably rapidly; therefore the identity of an oxide is not critical to the practice of the present invention.

Any available barium carbonate can be used in practicing the instant invention. For example, alpha and beta barium carbonate and natural witherite are all satisfactory for use.

In the paste mixing procedure described in the foregoing example, water was added during charging of the sulfuric acid. This water functions as a lubricant and helps to produce a paste of the proper consistency. The water does not participate in the chemical reactions and changes which are relevant to this invention. Likewise, the conventional expanders, lampblack and lignosulfonic acid, added to the paste mixture in the procedure of the example, do not participate in these chemical processes. During final drying of the paste on the plate grid, evaporation of the water is believed to increase plate porosity; the conventional expanders were added to assist in extending the service life of the plate, as previously discussed.

While the procedure described in the foregoing example constitutes the best presently contemplated mode, it will be appreciated that various changes and modifications are possible from the specific disclosure hereof without departing from the spirit and scope of the invention as defined in the following claims.

What I claim is:

1. In a method for producing a negative storage battery plate which includes the steps of preparing a paste from at least one lead oxide and sulfuric acid, shaping the paste to a desired plate configuration and drying the paste, the improvement comprising forming a mixture of lead oxide and barium carbonate, said barium carbonate being present in an amount from 0.1 to 1 parts by weight per 100 parts by weight of lead, calculated as PbO, said barium carbonate being distributed throughout said mixture; and mixing said mixture with sulfuric acid to form a paste, whereby, as a consequence of reaction between the sulfuric acid and the barium carbonate, finely divided barium sulfate is formed in situ in the paste and carbon dioxide is released to harden the paste.

2. The method of claim 1 wherein barium carbonate is present in said mixture in an amount of 0.1 to 0.4 parts by weight per 100 parts by weight of lead.

* * * * *